United States Patent Office 3,318,943
Patented May 9, 1967

3,318,943
2-CYANOCYCLOBUTANE CARBOXAMIDES AND PROCESS FOR PREPARING SAME
Janice L. Greene, Warrensville Heights, Murrel Godfrey, Cleveland, and James D. Idol, Jr., Shaker Heights, Ohio, assignors to The Standard Oil Company, Cleveland, Ohio, a corporation of Ohio
No Drawing. Filed Aug. 4, 1964, Ser. No. 387,480
8 Claims. (Cl. 260—464)

The present invention relates to novel 2-cyanocyclobutane carboxamides and to a novel process for preparing them.

The novel compounds embodied herein are the cis- and trans-2-cyanocyclobutane carboxamides having the formula

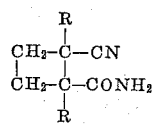

wherein the R groups may be the same or different and each represents hydrogen, a lower alkyl group or a halogen. Most preferred for the purposes of this invention are compounds of the foregoing structure wherein R is hydrogen or a methyl radical. The novel 2-cyanocyclobutane carboxamides embodied herein are prepared by selective hydrolysis of one nitrile group of the corresponding isomeric form of the 1,2-dicyanocyclobutane with alkaline hydrogen peroxide as follows:

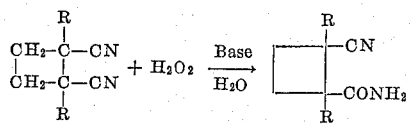

The foregoing reaction is conducted preferably at a temperature of from about 0° to 100° C. and more preferably from 0° C. to about 60° C. in the presence of a basic or alkaline agent such as sodium bicarbonate, sodium carbonate, potassium bicarbonate, potassium carbonate, calcium carbonate, sodium hydroxide, potassium hydroxide, calcuim hydroxide, magnesium hydroxide, amines, ammonia and quaternary ammonium compounds. Most preferred alkaline agents in the process of this invention are the alkali metal bicarbonates such as sodium bicarbonate and potassium bicarbonate.

The 1,2-dicyanocyclobutane precursors are well known and they can be prepared conveniently by the cyclization of two units of at least one of the following monomers: acrylonitrile, methacrylonitrile, alpha-chloro acrylonitrile, alpha-bromo acrylonitrile and the like and preferably acrylonitrile and methacrylonitrile. Most preferred precursor for the purposes of the present invention is the cyclic dimer of acrylonitrile having the formula:

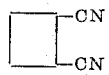

The cis- and trans-2-cyanocyclobutane carboxamides embodied in this invention are useful as antistatic agents for non-conducting materials such as plastics, paper, glass, rubber, synthetic fibers and the like.

This invention relates to the new chemical compounds in both their cis- and trans-forms which are prepared by the selective hydrolysis of one nitrile group of the corresponding isomeric form of the 1,2-dicyanocyclobutane with alkaline or basic hydrogen peroxides. The new 2-cyanocyclobutane carboxamides are white crystalline solids. The trans-2-cyanocyclobutane carboxamide melts at about 97 to 98° C. and the cis-2-cyanocyclobutane carboxamide melts at about 141–142° C.

These novel antistatic compounds are particularly useful in plastic products and can be incorporated directly as a powder by dry blending, in combination with other auxiliaries, such as fillers or plasticizers, or as a solution in a suitable solvent. Alternatively, a solution of the cyanoamide in an appropriate solvent can be applied directly to the surface of the material such as by spraying, dipping, wiping or brushing. Final concentration of the cyanoamide in the product may vary from 0.05% to 5% by weight, depending upon the type of material, type of application, relative humidity, and degree of protection desired. Plastic materials thus protected include polyvinyl chloride and polystyrenes and specific applications include combs, brushes and phonograph records.

Although the 1,2-cyclobutane dicarboxamide having the formula

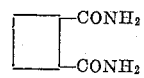

has been previously reported in J. Gen. Chem. (U.S.S.R.) 13, 373–81 (1943), the 2-cyanocyclobutane carboxamide differs considerably from the dicarboxamide in chemical and physical properties and, therefore, cannot be considered an analogue of the known compound. The dicarboxamide cannot be prepared in the same manner as the cyanocarboxamide embodied in the present invention. In the present process only the cyanocarboxamide is obtained even when a 350% excess of hydrogen peroxide is used in the hydrolysis reaction. Under these conditions it is indeed unexpected that only the one nitrile group is selectively hydrolyzed without giving mixtures of unreacted dinitrile and completely hydrolyzed diamide.

Another important difference between the prior art dicarboxamide and the novel cyanoamide of the present invention is brought out in the antistatic properties of the two compounds. The cyanoamide of our invention is an effective antistatic agent whereas the known dicarboxamide is essentially ineffective in dissipating static electricity from a nonconducting material. This is surprising in view of the fact that the dicyanocyclobutane actually increases the buildup of electrostatic charge on the surface of the non-conducting material rather than dissipating the charge. Further differences are apparent in the solubility of the two compounds. The novel cyanoamide of the present invention is highly soluble in water so that a water solution of the cyanoamide can be readily painted on the surface of a plastic for antistatic purposes whereas the prior art diamide is insoluble in water.

The process and compositions of this invention are further illustrated in the following example wherein the amounts of ingredients are expressed as parts by weight unless otherwise indicated.

EXAMPLE (A) Trans-2-cyanocyclobutane carboxamide was prepared as follows: To a stirred mixture of 318 grams of trans-1,2-dicyanocyclobutane and 50 grams of sodium bicarbonate in 100 ml. of water were added 300 ml. of 30% hydrogen peroxide in water in 50 ml. increments over a five-hour period. The temperature was maintained between 25–35° C. with stirring until the reaction exotherm had subsided. The solution was then evaporated and extracted with benzene. Concentration of the benzene extract gave 259 grams of trans-2-cyanocyclobutane carboxamide (66% yield) having a melting point of 97-98° C. The product was identified by infrared spectroscopy. Similar results were obtained when potassium bicarbonate was substituted for the sodium bicarbonate described above.

(B) Cis-2-cyanocyclobutane carboxamide was prepared as follows: To a stirred mixture of 22 grams of cis-1,2-dicyanocyclobutane, 10 grams of sodium bicarbonate and 50 grams of water were added 100 ml. of 30% hydrogen peroxide. The temperature of this mixture was maintained at 32° C. for two hours. After decomposition of the excess peroxide with potassium permanganate, the mixture was filtered and kept at room temperature while the product crystallized from the filtrate. A total of 26 grams (96% yield) of cis-2-cyano-cyclobutane carboxamide was obtained with a melting point of 141 to 142° C. from ethanol. The product was identified by elemental analysis.

|  | Calculated, percent | Found, percent |
|---|---|---|
| Carbon | 58.1 | 58.11 |
| Hydrogen | 6.45 | 6.48 |
| Nitrogen | 22.58 | 22.05 |
| Oxygen | 12.9 | 13.61 |

(C) The apparatus used in determination of the electrostatic charge was designed according to the description of S. M. Skinner, J. Gaynor and G. W. Sohl in Modern Plastics, February 1956, page 127. The agents to be tested were incorporated into a plastic by co-molding. The compounds tested were added in 1% by weight concentrations to a polyvinyl chloride molding powder. The mixture was then ground in a mortar until the mixture appeared to be homogeneously mixed. The mixture was then molded at 380° F., at 15,000 p.s.i. ram pressure, for 15 seconds to give disks which were two inches in diameter and 1/16 inch thick. The disks were trimmed and checked for antistatic properties by rubbing with a wool cloth and placing them in a Faraday ice pail where the charge decay was observed and recorded. A plot of charge versus time was made on semi-log graph paper and the half life was determined. Several determinations were run which were alternated with the unmodified disk as a standard reference. The polyvinyl chloride was of a commercial grade. The results of these tests are given below:

Agent tested:                            Half life (min.)
    None _____ 15
    Trans-1,2-cyclobutane dicarboxamide _____ 12.5
    Trans-2-cyanocyclobutane carboxamide _____ 4.6
    Trans-1,2-dicyanocyclobutane _____ 23

Similar results were obtained with the cis isomer in the foregoing test. Similar results were also obtained using 1,2-dicyano,1,2-dimethylcyclobutane as the starting material in place of the 1,2-dicyanocyclobutane described.

We claim:
1. The composition having the formula

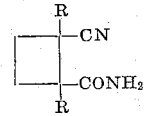

wherein R is hydrogen, a lower alkyl group or a halogen.

2. The composition having the formula

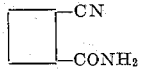

3. The trans-isomer of the composition of claim 2 having a melting point of about 97–98° C.

4. The cis-isomer of the composition of claim 2 having a melting point of about 141–142° C.

5. The process for preparing the compound having the formula

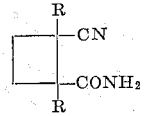

wherein R is hydrogen, a low alkyl group or a halogen comprising reacting a compound having the formula

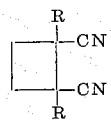

wherein the R groups correspond to those described above with hydrogen peroxide at a temperature of from about 0° to 100° C. in the presence of an alkali metal bicarbonate.

6. The process of claim 5 wherein the R groups are hydrogen.

7. The process of claim 6 wherein the alkali metal bicarbonate is sodium bicarbonate.

8. The process of claim 7 wherein the reaction temperature is from about 0° C. to 60° C.

No references cited.

CHARLES B. PARKER, Primary Examiner.

JOSEPH P. BRUST, Examiner.